Dec. 17, 1957   J. R. VAUGHN ET AL   2,816,390
COMBINATION FISHING TACKLE AND BAIT BOX
Filed May 9, 1955   2 Sheets-Sheet 1
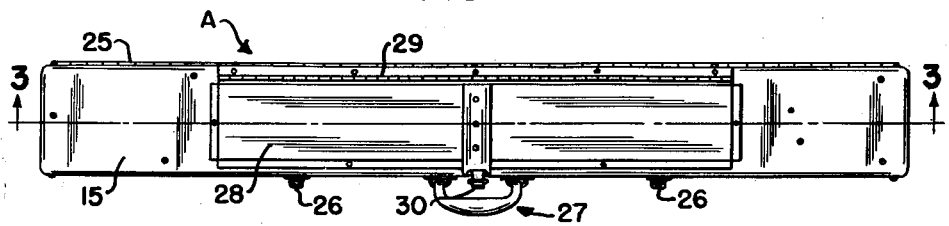
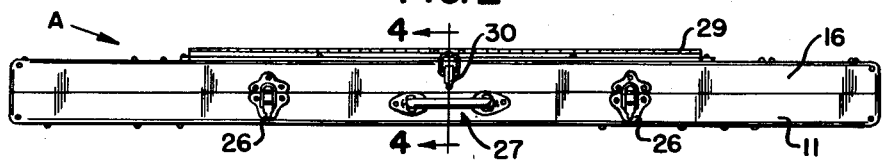
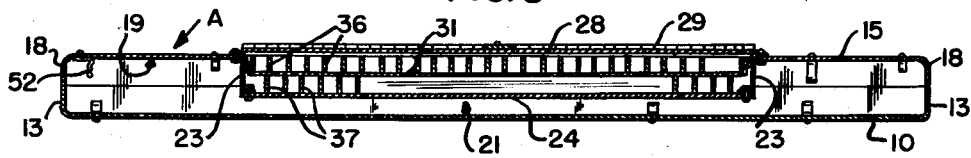
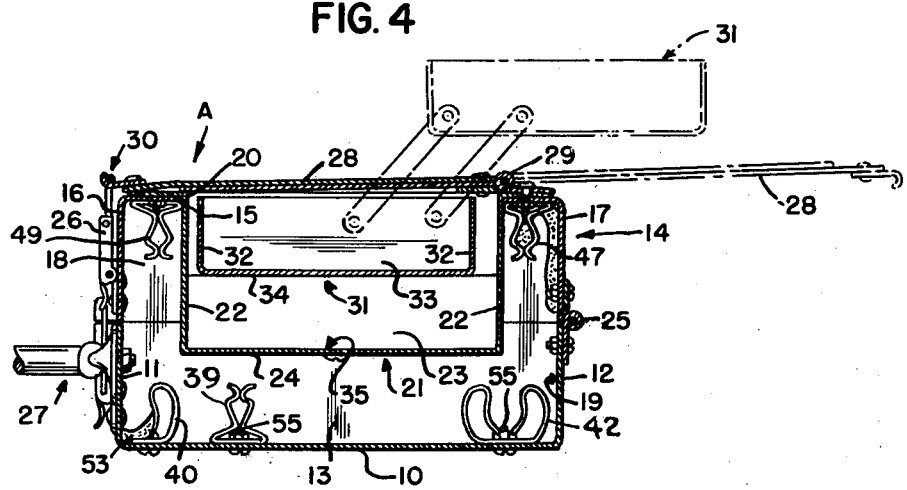
INVENTORS
James R. Vaughn
George E. Paine
ATTORNEYS Dec. 17, 1957     J. R. VAUGHN ET AL     2,816,390
COMBINATION FISHING TACKLE AND BAIT BOX
Filed May 9, 1955     2 Sheets-Sheet 2

INVENTORS
James R. Vaughn
George E. Paine

BY
ATTORNEYS

United States Patent Office 2,816,390
Patented Dec. 17, 1957

2,816,390

COMBINATION FISHING TACKLE AND BAIT BOX

James R. Vaughn and George E. Paine, Elkhart, Ind.

Application May 9, 1955, Serial No. 507,006

1 Claim. (Cl. 43—26)

This invention relates to fishing equipment and more specifically to a combination box for containing rods, reels, lines and allied fishing tackle, as well as bait, if desired.

An important object of the invention is to provide a box of this nature which is so constructed that rod sections may be housed therein without removal of reel or line, yet the sections with the reel and line attached may be readily removed from the box for use.

Another important object is to provide a box of this kind which is constructed and arranged so that a well is provided, occupying the intermediate or central zone of the interior of the box and carried by one of the walls thereof, such as a closure wall, whereby small tackle, bait or the like may be contained in the well, yet there is room provided, within the box, to contain a plurality of rod sections, reels and similar relatively large fishing equipment.

Yet another important object is to provide the well-containing box as described with the well so spaced that it will not damage the rods and reels when the well moves with movements of the closure.

Still another important object is to provide a box as described which eliminates waste space. Rod sections are generally long and slender but the reels are often rather bulky and, in order to accommodate both the sections and the reels, a conventional container therefor would be apt to contain considerable unoccupied space. By the provision of the centrally-disposed well and its receptacle therein for small tackle, etc., waste space is materially conserved.

Yet another important object is to provide a box for fishing tackle of various sizes, which box includes a major closure and a minor closure carried by the major closure, which minor closure is adapted to cover and uncover a well within the box, containing bait, small tackle, and the like, whereby the major closure need not be manipulated in the event it is desired to remove any of the contents of the well.

In addition, an important object is to provide a box to contain rods, reels, lines, etc., which box is convenient to carry and to dispose upon either its bottom or side walls since these walls are substantially flat. The box will not be apt to roll over when carried in the bottom of a boat for example.

Additionally, an important object is to provide a box to house disjointed rods as well as reels, and retain them against accidental movements while in the box.

Other objects and advantages of the invention will be apparent during the course of the following detailed description of the invention, taken in connection with the accompanying drawings, forming portions of this disclosure, and in which drawings;

Fig. 1 is a side elevation of an example of the box of this invention.

Fig. 2 is a top plan thereof.

Fig. 3 is a longitudinal section, substantially on the line 3—3 of Fig. 1.

Fig. 4 is an enlarged transverse section, substantially on the line 4—4 of Fig. 2 and showing in dots-and-dashes, a removed receptacle normally contained within the box.

Figure 5:
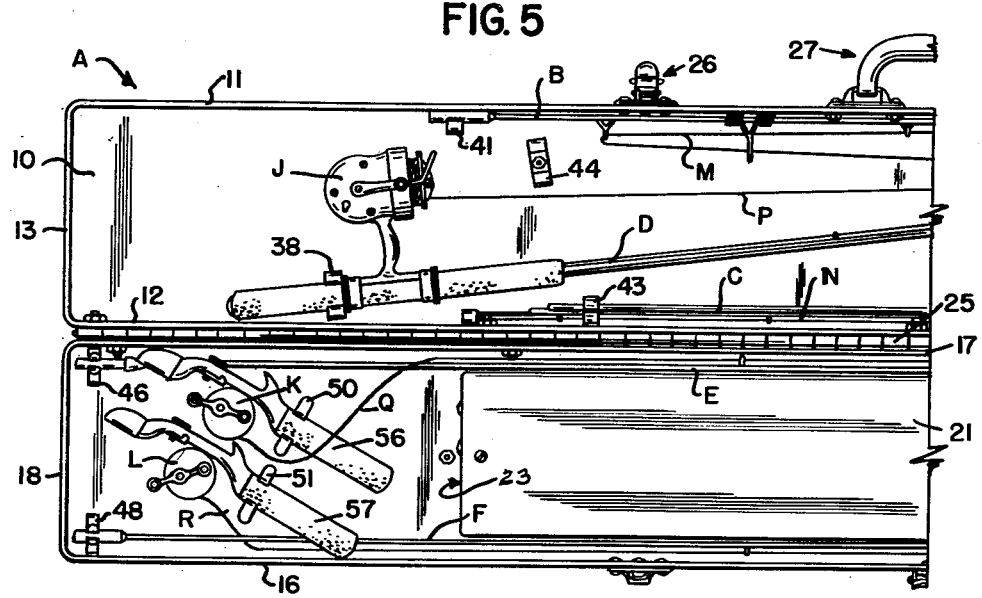
Fig. 5 is a fragmentary or left-hand portion of the box in an open condition.
Figure 5A:
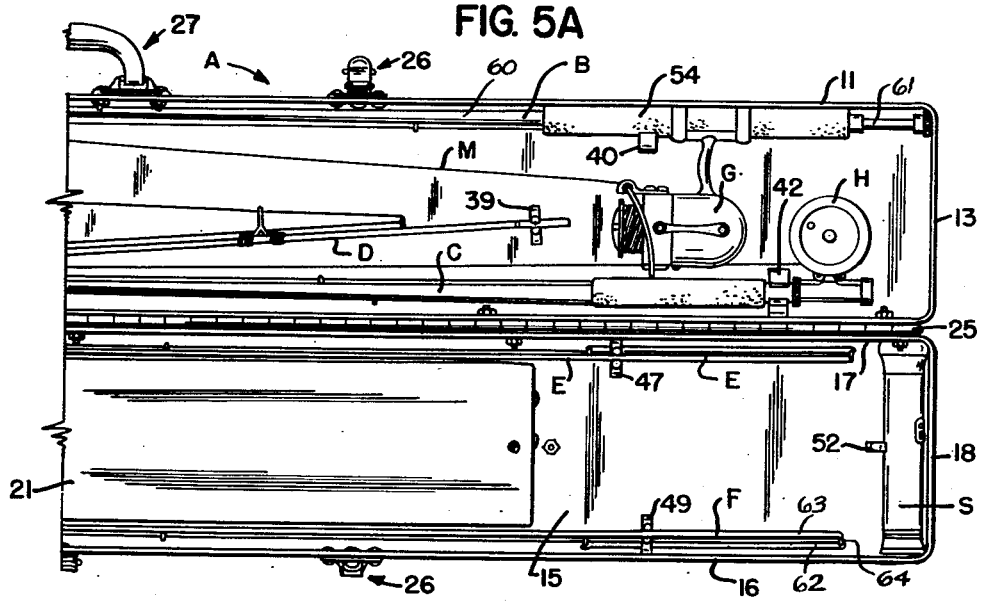
Fig. 5a is a fragmentary or right-hand portion of the box in an open condition, with the portions of Figs. 5 and 5a containing rods, lines, reels and other equipment.

In the drawings, wherein for the purpose of illustration is shown a preferred embodiment of the invention and wherein similar reference characters designate corresponding parts throughout the several views, the letter A designates a box of this invention, the letters B, C, D, E and F rods, G, H, J, K and L reels, M, N, P, Q and R, lines and S a flashlight.

The box A is shown as an elongated housing of rigid material, such as aluminum, steel, tin or combinations thereof, having a side wall 10, walls 11 and 12 substantially normal thereto, opposite end walls 13, and a major closure or lid 14, provided with a wall 15 opposite the wall 10, walls 16 and 17 normal to the wall 15, and opposite end walls 18, all defining a chamber 19. By way of example, the walls 11 and 16 may be substantially alike, the walls 12 and 17 substantially alike, all the end walls alike and the side walls 10 and 15 preferably differing only in that the closure wall 15 contains a centrally disposed opening 20 with its longitudinal edges preferably paralleling the longitudinal edges of the wall 15 and spaced therefrom a substantially equal distance (for example, one inch) and its transverse edges preferably paralleling the transverse edges of the wall 15 and each well spaced therefrom a substantially equal distance (by way of example, twelve inches).

Carried by this major closure or lid 14 is a well or container 21 opening to the opening 20 and having opposite side walls 22, opposite end walls 23 and a wall 24, facing the wall 10 when the box A is closed. The walls 22 and 23 are carried by the wall 15 at the edge portions thereof defined by the opening and, together with the wall 24, they are spaced from all the other walls of the box. By way of example only, the bottom wall 24 may be spaced substantially one-and-three-quarter inches from the wall 10 when the box is closed.

Suitable means 25 and 26 may be provided to attach the closure 14 to the remainder of the box. For example, the means 25 may be a piano hinge connecting the bottom walls 12 and 17 and the means 26 may be spaced-apart conventional separable fasteners, connecting the top walls 11 and 16.

A suitable hand carrying means 27 is preferably provided consisting, for example, of a conventional U-shaped handle secured to and extending from the top wall 11.

The minor closure 28, for the opening 20 is preferably a plate, which may be hinged, as by a piano hinge 29, to the wall 15 and provided with any suitable conventional closure fastener means 30, which may be carried partly by the closure 28 and partly by the top wall 16.

Carried within the well 21 may be a suitable removable receptacle 31 having opposite side and end walls 32 and 33 respectively and a wall 34. Preferably the wall 34 is spaced above the wall 24 when the receptacle is within the wall, so that a space 35 is provided between the two walls for tackle, bait, etc. Suitable partitions 36 and 37 may be provided for the receptacle 31 and space 35, with the bottom of the receptacle resting upon the partitions 37.

Means to detachably retain various portions of fishing equipment within the box A may comprise spaced apart spring clips 38 to 44 inclusive, secured to the wall 10 and projecting into the chamber 19. It will be noted that we prefer to secure the clips to the wall 10 by a single pivot for each clip which may comprise the shank 55 of a conventional nut and bolt assembly. This permits a manual pivoting, against the friction of the nuts of the clips, if desired, to orient two spaced apart clips to accommodate rod sections as desired. The one-arm clip 40 of Figs. 4 and 5ª is shown, by way of example, in Fig. 4 to be provided with a suitable resilient means 53 as a cushion of rubber to receive the handle portion of one rod B with the handle 54 in contact with the adjacent wall 11. Figs. 5 and 5ª show, by way of example, the disposition of three rods B, C and D retained by the clips 38 to 43 inclusive, since one rod section may be disposed over the next smaller-diametered section or sections of the same rod, such as, by way of example, the rod section 60 of rod B, over the rod section 61 thereof, with the lines in place and the reels clearing the well 21 when the closure 14 is in a closed position. It will be noted that the chamber 19 may accommodate quite bulky reels, as the spinning reels G and J, as well as the smaller reel H, all being cleared by the well 21. The spaced-apart clips 46 to 49 inclusive and the clips 50, 51 and 52 are shown, by way of example, secured to the wall 15 to extend into the chamber 19 and the clips 46 to 49 are adapted to retain the sections of rods E and F, such as shown in Figs. 5 and 5ª where for example, the rod sections 62 and 63 are disjointed, at the joint 64, while the clips 50 and 51 are adapted to detachably retain handles 56 and 57 and associated reels K and L. The clip 52 is shown as adapted to retain a conventional flashlight S, for example, against one end wall 18, and out of the way of the well 21. It will be noted that the rods and reels are out of contact with the walls of the well 21 whereby, when the well is lowered or raised upon movements of the major closure 14, the well will not damage the rods or reels.

The box A may be disposed upright upon the substantially flat walls 12 and 17, or upon the side wall 10 (in the former case, for convenience in lifting and the like and in the latter case for opening either the major closure 14 or minor closure 28). When the closure 14 is swung to the position shown in Figs. 5 and 5ª the chamber 19 is in view and any rod, for example, may be removed.

The spaces between the walls 22 of the well 21 and the walls 16 and 17 of the closure 14 are adapted to receive at least two disjointed conventional rods such as the rods E and F, with their handles 56 and 57 and reels K and L also carried by the closure 14 but between one end wall 23 of the well and one end wall 18 of the major closure 14. They interfere in no way with the rods B, C and D and their reels G, H and J, carried by the other portion of the box A and clearing the well 21. We are aware of the provision of fishing baskets or creels and bait buckets having major lids carrying wells and closed by minor lids, but these containers are not adapted to house and retain disjointed rods, with their associated lines and reels, in the spaces between the walls of the containers and those of the wells, with the rods and reels out of contact with the walls of the well which well moves with swinging movements of the closure.

Various changes may be made to the form of the invention herein shown and described without departing from the spirit of the invention or scope of the claim.

What is claimed is:

A combination fishing tackle and bait box having provisions for housing a plurality of disjointed fishing rods with their associated lines and reels, said box including an elongated housing having outer walls comprising a side wall, two elongated parallel walls normal thereto and connected therewith and two parallel end walls normal to said side wall and joined thereto, defining an open-mouthed chamber; a major elongated closure provided with a side wall facing the first-named side wall when said closure is in a closed position, two elongated parallel walls normal thereto and connected therewith and two parallel end walls normal to the second-named side wall; means hinging said closure to said housing; said second-named side wall being provided with an opening spaced from the edges of said second-named side wall; a well rigidly carried by said second-named side wall and having four walls extending to the edges of said opening and extending into said chamber to short of said first-named side wall when said closure is in a closed position, said well having a bottom wall paralleling and spaced from said side walls; a movable lid for said opening; and means to detachably retain portions of fishing equipment in said chamber including clips carried by said side walls and some of said clips being disposed so that disjointed fishing rods may extend under said bottom wall and free of said bottom wall when said closure is in a closed position, and other disjointed fishing rods may be disposed in the spaces between said elongated walls of said closure and the walls of said well facing said elongated walls of said closure.

References Cited in the file of this patent

UNITED STATES PATENTS

| | | |
|---|---|---|
| 938,293 | Wakefield et al. | Oct. 26, 1909 |
| 2,131,408 | Murrer | Sept. 27, 1938 |
| 2,149,087 | Fisher | Feb. 28, 1939 |
| 2,501,270 | Fleming | Mar. 21, 1950 |
| 2,595,230 | Daviau | May 6, 1952 |
| 2,650,449 | Suring | Sept. 1, 1953 |